(12) United States Patent
Becker

(10) Patent No.: US 11,633,259 B2
(45) Date of Patent: Apr. 25, 2023

(54) HANDPIECE ADAPTER FOR AN ENDODONTIC FILE

(71) Applicant: MDT MICRO DIAMOND TECHNOLOGIES LTD., Afula (IL)

(72) Inventor: Arie Becker, Kibbutz Afikim (IL)

( * ) Notice: Subject to any disclaimer, the term of this patent is extended or adjusted under 35 U.S.C. 154(b) by 181 days.

(21) Appl. No.: 16/541,162

(22) Filed: Aug. 15, 2019

(65) Prior Publication Data
US 2021/0045840 A1  Feb. 18, 2021

(51) Int. Cl.
*A61C 5/42*  (2017.01)
*A61C 1/14*  (2006.01)
*A61C 1/18*  (2006.01)

(52) U.S. Cl.
CPC ............ *A61C 5/42* (2017.02); *A61C 1/145* (2013.01); *A61C 1/186* (2013.01)

(58) Field of Classification Search
CPC ........... A61C 5/42; A61C 1/145; A61C 1/186; A61C 1/142; B25B 23/141; B25B 23/1422; B25B 23/1427; A61B 2090/031; A61B 90/03; A61B 17/162; F16D 7/002; F16D 7/021; F16D 7/024; F16D 7/048; Y10T 279/3412; Y10T 279/3418
See application file for complete search history.

(56) References Cited

U.S. PATENT DOCUMENTS

| | | | | |
|---|---|---|---|---|
| 3,208,316 A | * | 9/1965 | Scribner | B25B 23/142 81/476 |
| 4,006,787 A | * | 2/1977 | Rumpp | B23B 31/005 173/132 |
| 4,536,156 A | * | 8/1985 | Cattin | A61C 5/50 433/102 |
| 5,017,138 A | * | 5/1991 | Schilder | A61C 5/42 433/102 |
| 5,464,407 A | * | 11/1995 | McGuire | A61B 17/15 606/104 |
| 5,642,998 A | * | 7/1997 | Riitano | A61C 5/42 433/102 |

(Continued)

FOREIGN PATENT DOCUMENTS

| | | | |
|---|---|---|---|
| CH | 591930 A5 * | 10/1977 | ............. B24B 23/02 |
| EP | 2123233 | 11/2009 | |

(Continued)

OTHER PUBLICATIONS

"Offset." Merriam-Webster.com Dictionary, Merriam-Webster, https://www.merriam-webster.com/dictionary/offset. Accessed Aug. 27, 2021. (Year: 2021).*

(Continued)

*Primary Examiner* — Heidi M Eide

(57) ABSTRACT

In some embodiments, the current invention relates to a method and/or system for using a standard dental handpiece for endodontic cleaning. For example, a dental adapter is disclosed having a fitting for a standard dental handpiece, a torque limiter and/or a mount for an endodontic file. For example, the adapter may be single use and/or multi use. In some embodiments, the mount includes the torque limiter. For example, an endodontic file may be connected to the mount with a friction fitting that allows rotation of the file with respect to the mount at high torque. Optionally the mount is positioned eccentrically with respect to the fitting.

14 Claims, 16 Drawing Sheets

(56) References Cited

U.S. PATENT DOCUMENTS

| | | | |
|---|---|---|---|
| 6,196,036 B1 * | 3/2001 | Andersen | E05B 19/04 |
| | | | 70/432 |
| 6,575,747 B1 * | 6/2003 | Riitano | A61C 5/44 |
| | | | 433/102 |
| 6,616,446 B1 * | 9/2003 | Schmid | A61B 17/14 |
| | | | 433/131 |
| 6,695,321 B2 | 2/2004 | Bedi et al. | |
| 7,815,433 B2 | 10/2010 | Bailey et al. | |
| 10,391,616 B1 * | 8/2019 | Cantion | B25B 23/0014 |
| 2011/0171595 A1 | 7/2011 | Turner et al. | |
| 2011/0208192 A1 * | 8/2011 | Palti | A61B 17/1644 |
| | | | 606/79 |
| 2011/0212413 A1 * | 9/2011 | Becker | A61C 5/42 |
| | | | 433/102 |
| 2013/0093142 A1 * | 4/2013 | Saur | B25F 3/00 |
| | | | 279/44 |
| 2013/0260334 A1 * | 10/2013 | Pernot | A61C 5/42 |
| | | | 433/81 |
| 2014/0163555 A1 | 6/2014 | Pernot et al. | |
| 2015/0342702 A1 * | 12/2015 | Borgschulte | A61C 5/40 |
| | | | 433/27 |
| 2016/0003041 A1 * | 1/2016 | Fader | E21C 35/197 |
| | | | 299/113 |
| 2016/0346909 A1 * | 12/2016 | Victor | A61B 90/03 |

FOREIGN PATENT DOCUMENTS

| | | | |
|---|---|---|---|
| EP | 3323376 | | 5/2018 |
| JP | H03161209 A | * | 7/1991 |
| JP | S6011709 U | * | 1/1995 |
| WO | 2018060343 | | 4/2018 |

OTHER PUBLICATIONS

Machine translation of CH 591,930 (Year: 1977).*
Mangat et al. in "Torque and Speed in Endodontics: A Review" International Journal of Oral Care and Research, Apr.-Jun. 2018;6(2):97-100.

* cited by examiner

HANDPIECE ADAPTER FOR AN ENDODONTIC FILE

FIELD AND BACKGROUND OF THE INVENTION

The present invention, in some embodiments thereof, relates to system for endodontic cleaning.

U.S. Pat. No. 7,815,433 appears to disclose "an improved dental tool drive arrangement for a handpiece with a drive head, the tool drive arrangement permitting length adjustment of the tool in the drive head by concentrically supporting the tool in the drive head at any position from a fully inserted position to a maximum retracted position. The tool drive arrangement preferably includes a tool and a rotatable tool supporting element for concentrically supporting the tool from the fully inserted to the maximum retracted position, the tool preferably including a maximum retraction indicator for indicating to a user when the tool has been retracted to the maximum retraction position. This provides a significant advantage over the prior art by allowing a user to adjust the exposed length of a rotatable tool, preferably a dental bur, without exceeding safe operating limits. The invention also relates to an improved drive spindle which allows depth adjustment of a tool in a dental handpiece while maintaining efficient torque transfer and concentricity during high speed rotation."

Mangat et al. in "Torque and Speed in Endodontics: A Review" International Journal of Oral Care and Research, April-June 2018; 6(2):97-100 appear to disclose that, "Handpieces and burs are among the most frequently used mechanical devices in dentistry. High-speed handpieces are used for restorative procedures and endodontic access, while low-speed handpieces are used for restorative, oral, and periodontal surgery, as well as endodontic, orthodontic, hygiene, and laboratory procedures. Speed refers not only to revolutions per minute but also to the surface feet per unit that the tool has with the work to be cut. A variety of speeds for different rotary instrumentation has been recommended by the manufacturers. Conventional endodontic motors to recent motors use a wide range of speed of 150 rpm-40,000 rpm."

G. M. Yared et al.; Influence of rotational speed, torque and operator proficiency on failure of Greater Taper files, International Endodontic Journal, volume 35 issue 1, January 2002 appears to disclose, "Greater Taper Ni-Ti rotary instruments (GT) were used in a crown-down technique. In one group (rotational speed evaluation) of canals (n=300) speeds of 150, 250 and 350 r.p.m. (subgroups 1, 2 and 3) were used. Each one of the subgroups included 100 canals. In a second group (evaluation of torque) (n=300) torque was set at 20, 30 and 55 Ncm (subgroups 4, 5 and 6). In the third group (evaluation of operator proficiency) (n=300) three operators with varying experience (subgroups 7, 8 and 9) were also compared. Each subgroup included the use of 10 sets of GT rotary instruments and 100 canals of extracted human molars. Each set of instruments was used in up to 10 canals and sterilized before each case. NaOCl 2.5% was used as an irrigant. The number of locked, deformed, and separated instruments was recorded for each group. Statistical analysis was carried out with pairwise comparisons using Fisher's exact tests for each of the failure type."

Additional background art includes European patent application publication no. EP3323376, U.S. patent application publication no. 20140163555, European patent no. EP2123233, U.S. patent application publication no. 20110171595, International patent application publication no. WO2018060343, and U.S. Pat. No. 6,695,321.

SUMMARY OF THE INVENTION

According to an aspect of some embodiments of the invention, there is provided a system for endodontic procedure including: a high torque dental handpiece having a standard chuck an adapter including a fitting for the standard chuck, a torque limiter and a mount for an endodontic file.

According to some embodiments of the invention, the torque limiter is positioned between the fitting and the mount.

According to some embodiments of the invention, the torque limiter is included in the mount.

According to some embodiments of the invention, the mount includes a friction fitting.

According to some embodiments of the invention, the fitting is one a proximal end of the adapter and the mount is on a distal end thereof.

According to some embodiments of the invention, where the handpiece is configured for rotating the adapter at a rate of greater than 1000 RPM.

According to some embodiments of the invention, where the handpiece is configured for rotating the adapter at a torque of greater than 0.5 N.cm.

According to an aspect of some embodiments of the invention, there is provided an adapter for use of a dental handpiece for endodontic procedure including: a fitting for a chuck of the dental handpiece; a torque limiter; and a mount for an endodontic file.

According to some embodiments of the invention, the torque limiter is positioned between the fitting and the mount.

According to some embodiments of the invention, the torque limiter is included in the mount.

According to some embodiments of the invention, the mount includes a friction fitting.

According to some embodiments of the invention, the adapter further includes a distal flange.

According to some embodiments of the invention, the torque limiter is configured limit a torque on the file to less than 0.1 N.cm.

According to some embodiments of the invention, the mount is eccentric in relation to the fitting.

According to some embodiments of the invention, an axis of the mount offset in relation to an axis of the fitting.

According to some embodiments of the invention, an axis of the mount not parallel to an axis of the fitting.

According to an aspect of some embodiments of the invention, there is provided an adapter for use in an endodontic procedure including: a fitting for a dental handpiece chuck and a mount for an endodontic file positioned eccentrically with respect to the fitting.

According to some embodiments of the invention, an axis of the mount is offset in relation to an axis of the fitting.

According to some embodiments of the invention, an axis of the mount not parallel to an axis of the fitting.

According to some embodiments of the invention, the mount is entirely inside the flange.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
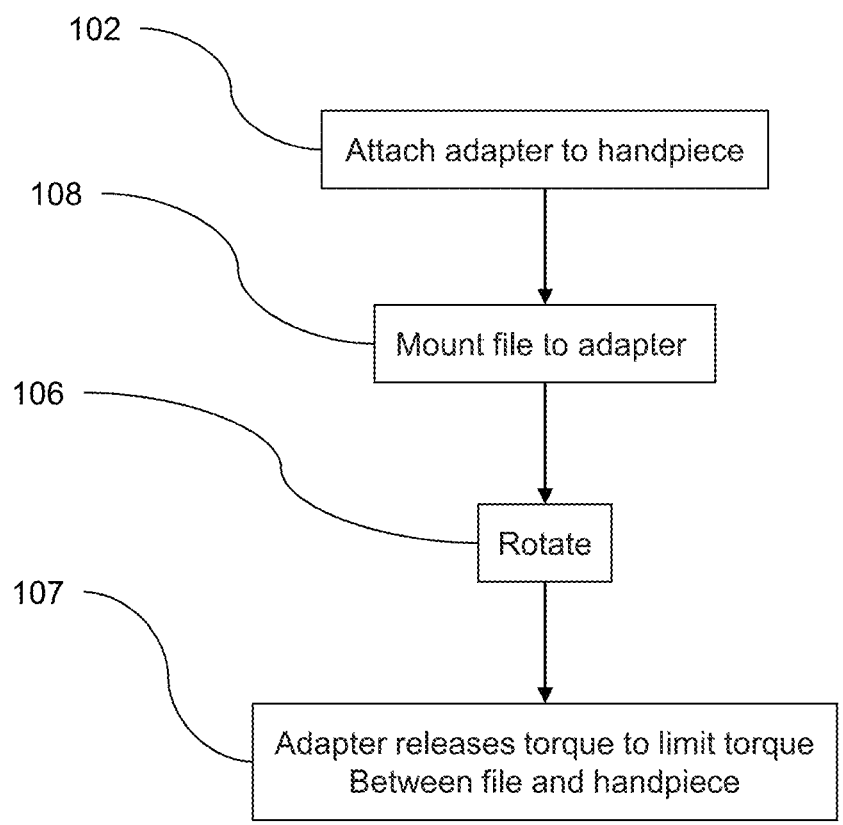
FIG. 1 is a flowchart illustrating a method of endodontic cleaning in accordance with an embodiment of the current invention.

The present invention, in some embodiments thereof, relates to system for endodontic cleaning.

Overview

An aspect of some embodiments of the current invention relates to a system that facilitates endodontic cleaning using a non-specific dental handpiece. In some embodiments, the system includes an adaptor having a standard fitting (e.g. for connecting to a standard dental chuck, collet, and/or spindle). Optionally the adaptor includes a torque limiter. For example, there may be a friction connection that allows slippage at high torque. Optionally, the adaptor includes a mount for an endodontic file. For example, the mount may include a clamp and/or a friction fitting and/or an interference fitting. Optionally, the mount for the endodontic file includes the torque limiter. For example, the mount may allow the endodontic file to rotate and/or slip with respect to the adapter when the torque is too high. In some embodiments, the system includes a endodontic file configured for cleaning and/or disinfecting endodontic structures at high rotation rates (for example at between 300 to 500 rpm and/or between 500 to 1000 pm and/or between 1000 to 2000 rpm and/or between 2000 to 5000 rpm and/or between 5000 to 10000 rpm and/or between 10000 to 40000 rpm). For example, the file may have enhanced elasticity and/or may have the form of a brush.

An aspect of some embodiments of the current invention relates to a system for endodontic cleaning via a whipping motion. Optionally the system includes an eccentric mount for an endodontic file. For example, the mount may be positioned off center with respect to an axis of rotation of a dental handpiece and/or at an angle to the axis of rotation. In some embodiments, an eccentric adapter is attached to a centric chuck of a dental handpiece. Optionally, the adapter incudes a standard fitting and/or a mount for an endodontic file positioned non-centric with respect to the fitting. Optionally, the mount for the endodontic file is configured to be torque limiting. For example, the mount may include a friction fitting.

Detailed Embodiments

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1 is a flowchart illustrating a method of endodontic cleaning in accordance with an embodiment of the current invention. In some embodiments, a standard dental handpiece is used for endodontic cleaning. For example, the handpiece may be configured to apply high torque (for example greater than 5 N.cm and/or between 3 to 5 N.cm and/or between 1 to 3 N.cm and/or between 0.1 to 1 N.cm) to a dental burr. In some embodiments the handpiece may be configured to rotate the burr at a speed higher than that usually used for endodontic files (e.g. the handpiece may be configured for rotation between 300 to 700 rpm and/or between 700 to 1500 rpm and/or between 1500 to 4000 rpm and/or between 4000 to 40000). Optionally the adapter is configured to limit 107 torque. Optionally, the handpiece is used to rotate 106 an endodontic file. In some embodiment the torque applied to the file may be limited 107. For example, a mount between the file and the handpiece may include a friction fitting that limits 107 torque on the file. For example, the fitting may limit 107 torque to between 20 to 30 g-cm and/or between 1 to 20 g-cm and/or between 20 to 40 g-cm and/or between 40 to 100 g-cm and/or between 100 to 200 g-cm. In some embodiments, an adapter is may be attached 102 to the handpiece and/or between the handpiece and the endodontic file. Optionally, the file is mounted 108 to the adapter.

In some embodiments, an endodontic file is mounted 108 to an adapter using a fitting that limits 107 torque allows rotation of the file with respect to the adapter. For example, a torque limiter may not allow rotation of the file with respect to the handpiece driving rotation when the torque is too high. For example, the mount may include a friction connection. Additionally or alternatively, the connection between the adapter and the handpiece may include a high torque connection (for example a chuck and/or collet may be used for high torque attachment). Alternatively or additionally, an endodontic file and/or an adapter may be attached 102 to the handpiece with a torque limiting attachment. Alternatively or additionally, an endodontic adapter may include an intrinsic torque limiter (for example part of a shaft of the adapter may allow rotation between an attachment to the handpiece and a mount for the file).

In some embodiments, a file may be changed while the adapter remains in the chuck of the handpiece. For example, the adapter may remain in the handpiece and/or a file may be inserted and/or removed from a file mount of the adapter. Alternatively or additionally, the adapter and file may be connected and/or disconnected from the handpiece as a unit.

Figure 2A:
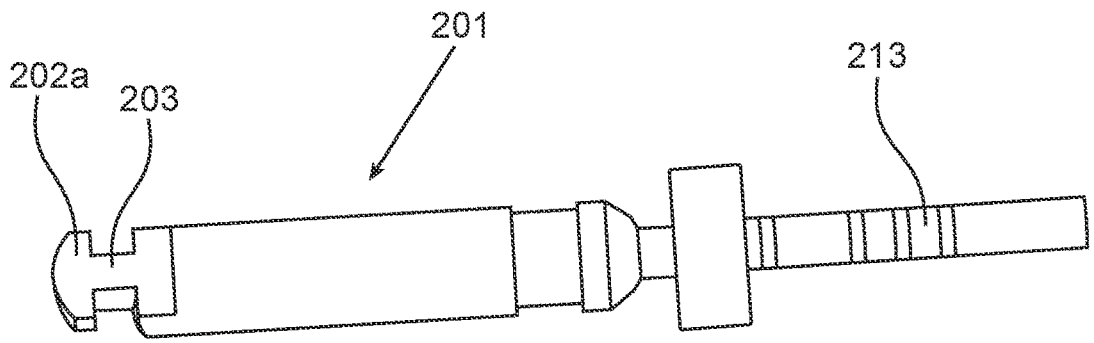
FIG. 2A is an image illustrating a chuck fitting in accordance with an embodiment of the current invention.
Figure 2B:
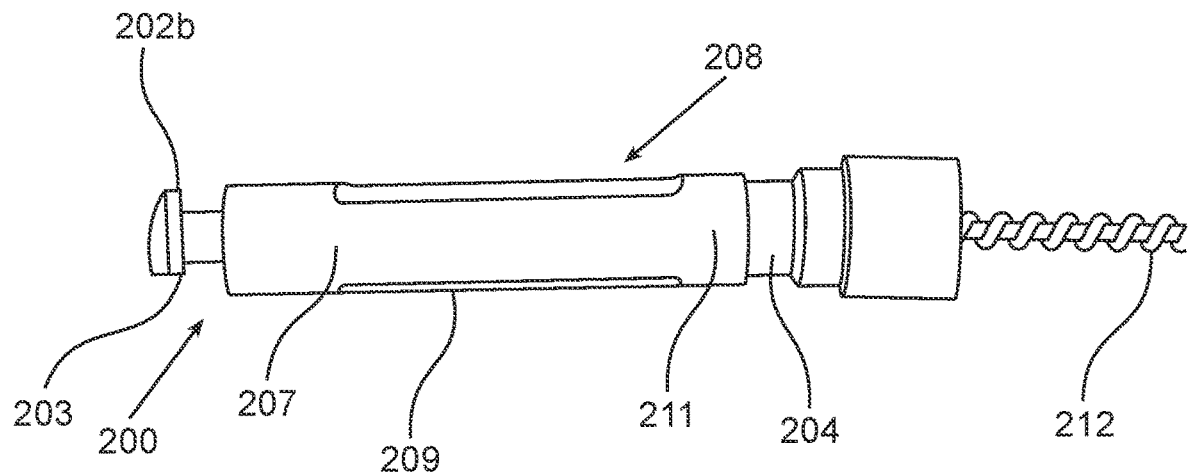
FIG. 2B is an image illustrating an adapter in accordance with an embodiment of the current invention.
Figure 2C:
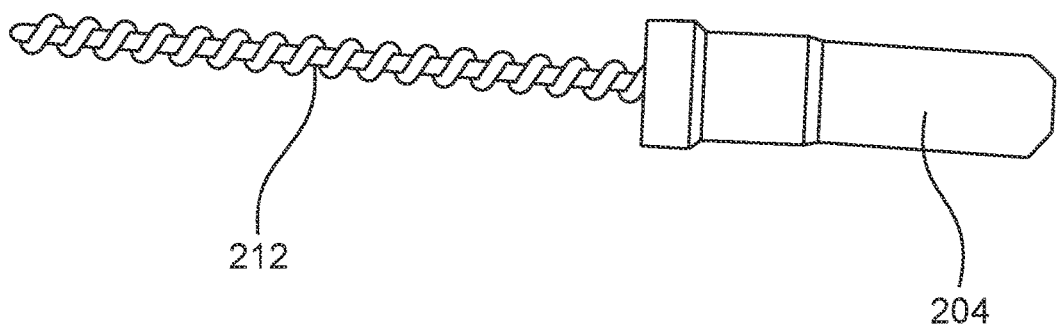
FIG. 2C is an image illustrating an endodontic fitting in accordance with an embodiment of the current invention.

FIGS. 2A-2C are images illustrating a chuck fitting 201, an adapter 200 and an endodontic file 212 with a torque limiting fitting 204 respectively in accordance with an embodiment of the current invention. For example, an adapter 200 may include a torque limiting mount 208 for an endodontic file 212. Optionally, mount 208 may include a friction fitting. For example, a friction fitting elasticity of sleeve 207 may control the friction and/or torque over a range of fitting tolerances. Optionally the sleeve 207 may include elasticity enhancements, for example, a longitudinal slit 209. In some embodiments, adapter 200 includes a collet fitting 202b. For example, collet fitting 202b may similar to a collet fitting 202a of a dental file 213. Optionally, the collet fitting 202b is on a proximal portion and/or a proximal end of the adapter 200. Fitting 202a, 202b is optionally configured for a high torque drive, for example fitting 202a, 202b may include a flattened section 203 and/or a D-shaped profile and/or other known fitting shapes (e.g. hexagonal etc.)

In some embodiments, the mount 208 may include a retainer portion 211 that inhibits release of the fitting 204. For example, the retainer portion 211 may include a section of the sleeve 207 with reduced elasticity. For example, a ring on the distal portion of sleeve 207 may include elastic enhancements and/or may have a larger wall thickness and/or may have a reduced inner diameter. For example, when one tries to pull fitting 204 out of sleeve 207 the proximal portion of fitting 204 which is expanded inside of the more elastic proximal portion of sleeve 207 resists being pulled out into portion 211 of the sleeve 207.

Figure 3:
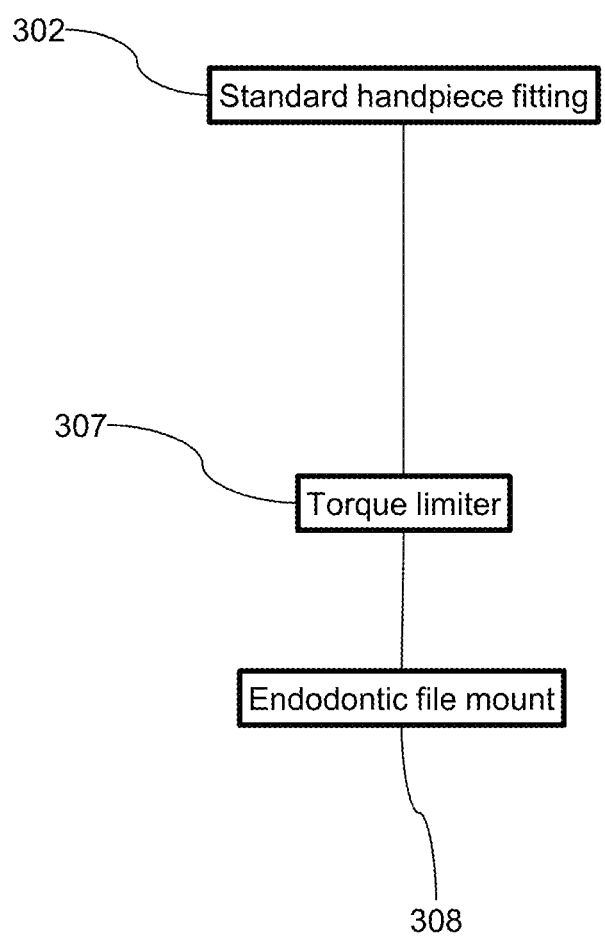
FIG. 3 is a block diagram illustrating an adapter in accordance with an embodiment of the current invention.

FIG. 3 is a block diagram illustrating an adapter in accordance with an embodiment of the current invention. In some embodiments, an adapter includes a fitting 302 for a dental handpiece chuck. For example, the fitting 302 may be on a proximal end of the adapter. Optionally the adapter includes a mount 308 for an endodontic file. For example, the mount 308 may be positioned on a distal end of the adapter. Optionally the adapter includes a torque limiter 307. In some embodiments, a torque limiter 307 may be an independent part of the adapter, for example connecting between the mount 308 and the fitting 302. Alternatively or additionally, the torque limiter 307 may be included in the mount 308 and/or in the connection between the mount 308 and an endodontic file.

In some embodiments, an adaptor may include a fitting 302 for a quick connect collet (e.g. a D-collet). Optionally the fitting 302 may have a standard size for example 2.35 mm, 3.0 mm, 3.175 mm. Alternatively or additionally the fitting 302 may include a round spindle for connection to a standard chuck. Alternatively or additionally, other kinds and/or sizes of fittings are possible.

In some embodiments, an adapter may be made for multiple use. For example, the adapter may be made of a material that allows cleaning and/or sterilization (for example metal e.g. stainless steel and/or nitinol and/or another elastic and/or super elastic material). Alternatively or additionally, the adapter may be configured for single use. For example, it may be made of plastic.

Figure 4:
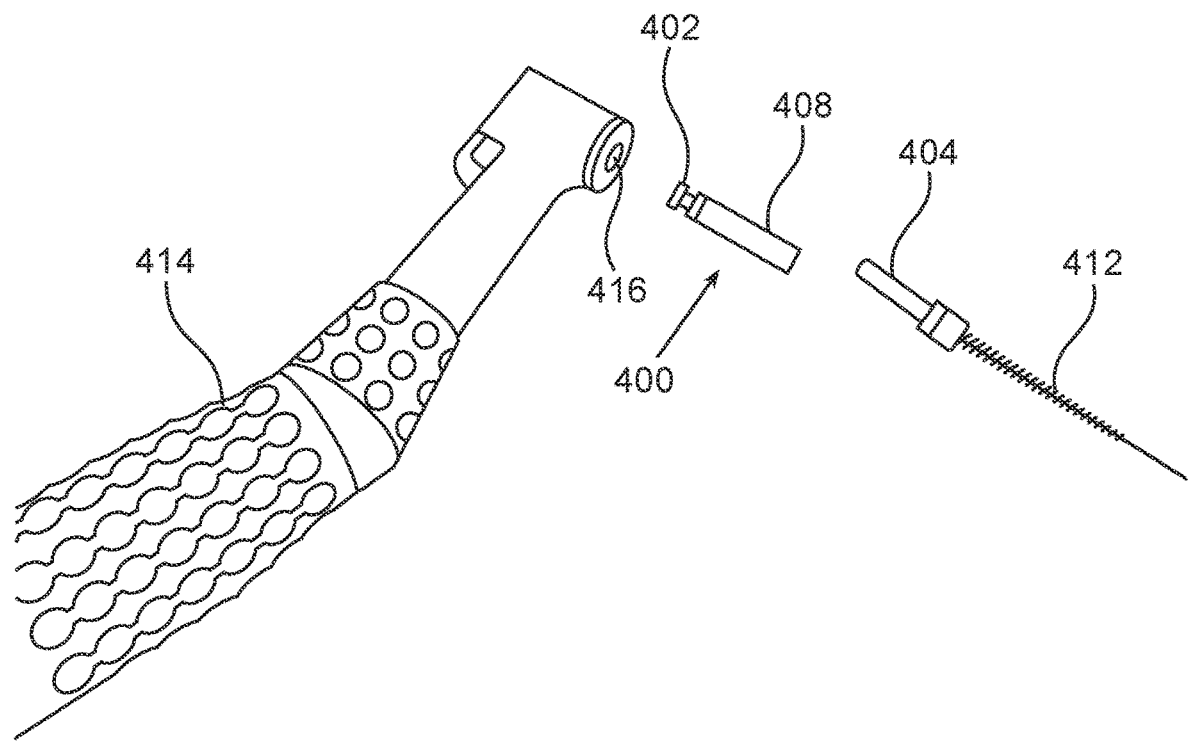
FIG. 4 is a perspective view of a system for endodontic cleaning in accordance with an embodiment of the current invention.

FIG. 4 is a perspective view of a system for endodontic cleaning in accordance with an embodiment of the current invention. In some embodiment, the system includes an adapter 400. For example, adapter 400 includes a fitting 402 configured for attachment to a standard chuck 416 of a dental handpiece 414. Optionally the adapter 400 includes a mount 408. For example, mount 408 may be configured for attachment to an endodontic file 412. For example, the file may include a fitting 404 that fits mount 408. For example, the mount 408 and/or fitting 404 may be configured to limit torque between the handpiece and the file 412. For example, a friction fitting may allow slippage at torques of greater 0.05 N.cm. and/or greater than 0.01 N.cm and/or greater than 0.1 N.cm and/or greater than 0.5 N.cm and/or greater than 1 N.cm. Optionally the system includes a dental handpiece 414. Optionally the handpiece may be a standard handpiece 414.

In some embodiments, mount 408 will include a sleeve and/or have a cavity sized to hold fitting 404 of file 412. For example, the outer diameter of the adapter may be approximately 2.35 mm and/or the inner diameter may be approximately 2.0 mm. For example, the wall thickness of the mount may be approximately 0.17 mm. For example, the wall thickness may range between 5% to 9% the outer diameter of the sleeve.

In some embodiments, handpiece 414 may be limited to high rate revolutions and/or high torque. Alternatively or additionally, the handpiece 414 may have an adjustable rotation rate and/or adjustable maximum torque.

Figure 5A:
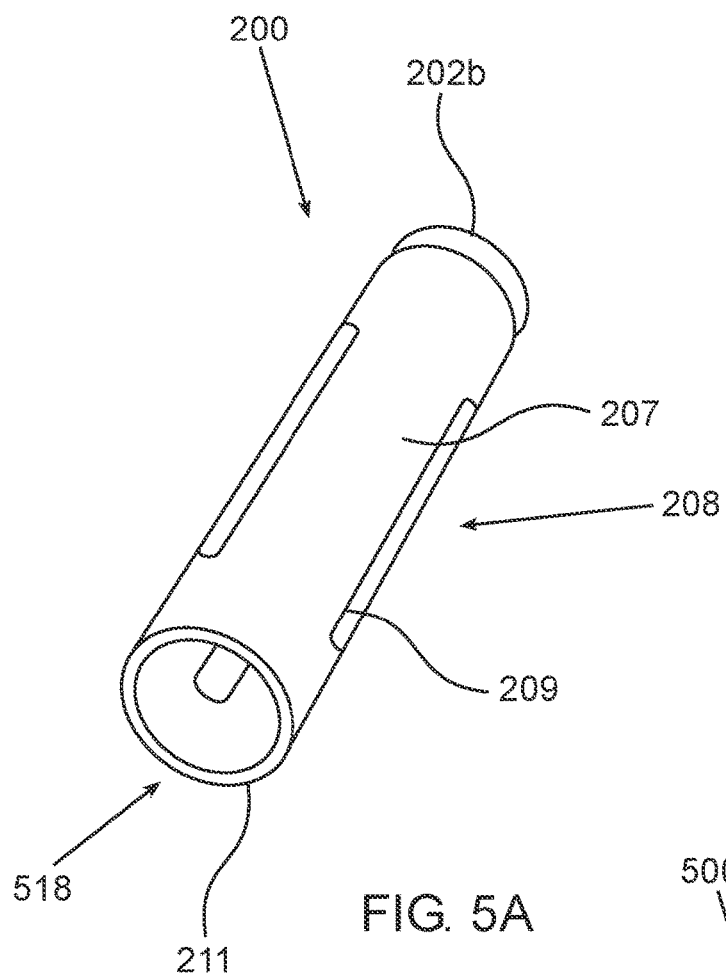
FIG. 5A is a perspective view of endodontic cleaning adapter in accordance with an embodiment of the current invention.
Figure 5B:
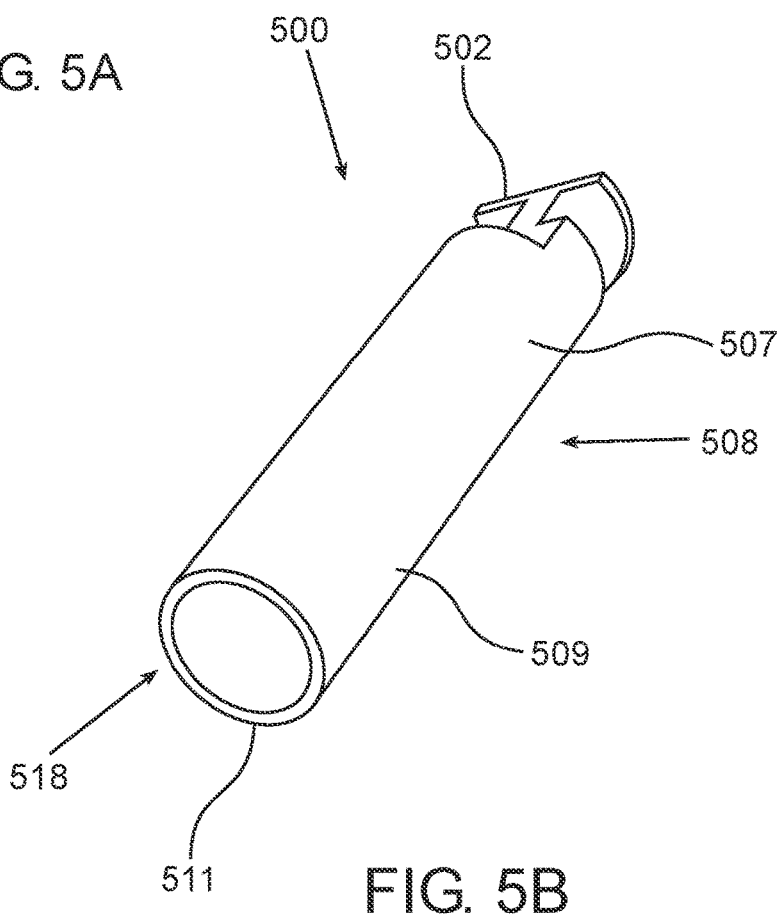
FIG. 5B is a perspective view of endodontic cleaning adapter in accordance with an embodiment of the current invention.

FIGS. 5A, 5B are perspective views of endodontic cleaning adapters 200, 500 respectively in accordance with an embodiment of the current invention. In some embodiments, an adapter 200 may be designed for multiple use. For example, the adapter may be made of metal. Alternatively or additionally, an adapter 500 may be made for single use. For example, the adapter may be made of plastic. Optionally, and adapter 200, 500 includes a sleeve 507, 207 having a cavity 518. Optionally cavity 518 is sized and shaped to retain a fitting of an endodontic file. For example, the cavity 518 may be approximately cylindrical with a diameter of approximately 2.0 mm. Optionally the elasticity of the walls and/or size of the cavity and friction coefficient are configured and/or balanced to hold the fitting of the file with a predetermined maximum torque around the axis of the cylinder. For example, the maximum torque may be less than 0.005 N.cm and/or less than 0.01 N.cm and/or less than 0.05 N.cm and/or less than 0.1 N.cm and/or less than 1 N.cm. Optionally, an adapter includes a standard dental drill fitting 202b, 502. Optionally, an adapter includes a torque limiting mount 208, 508 for an endodontic file and/or a retainer 211, 511 and/or an elasticity adjusting feature 209, 509. Optionally, mount 208, 508 and fitting 502, 202b are mounted with a shared axis of revolution. For example, when adapter 200, 500 is attached to and/or spun by a handpiece, the adapter spins around the axis of mount 208, 508.

Figures 6A, 6B:
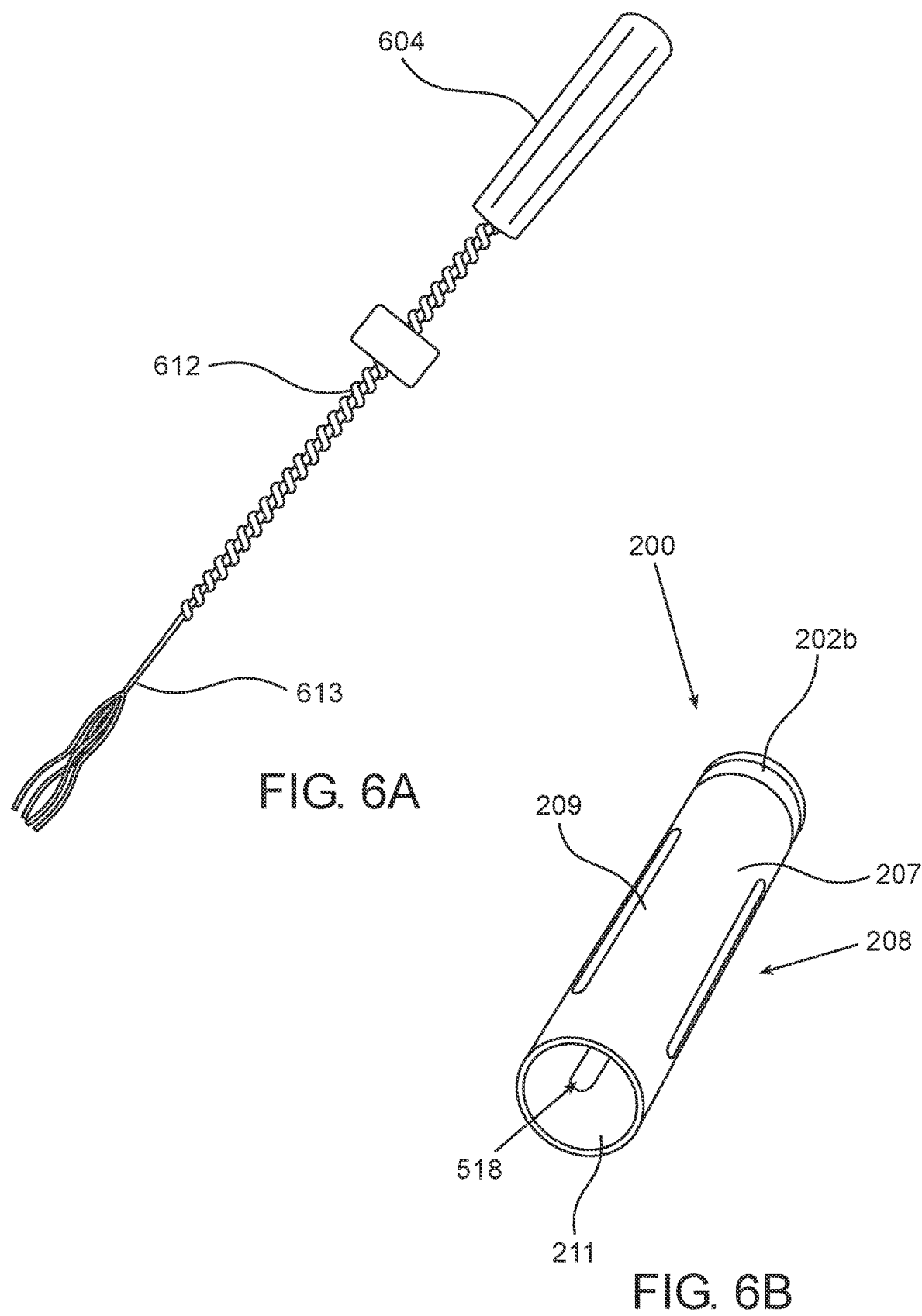
FIG. 6A is a perspective view of endodontic file in accordance with an embodiment of the current invention.
FIG. 6B is a distal view of an adapter in accordance with an embodiment of the current invention.

FIGS. 6A, 6B are perspective views of an endodontic file and a distal view of an adapter respectively in accordance with embodiments of the current invention. In some embodiments, an adapter 200 includes a mount 208 sized and shaped to hold a fitting 604 of an endodontic file 612. Optionally, file 612 may include a brush 613 and/or an impeller. For example, for example the brush 613 may be configured for fitting in thin channels and/or brush 613 may be elastic for fitting into sub-channels of a tooth root and/or stirring and/or activating fluid (for example and endodontic irrigation fluid such as NaOCl). Optionally the file 612 is configured for low torque and/or high rotational rate endodontic cleaning. For example, the file 612 may include a Gentlefile as available from Medicnrg Kibbutz Afikim 1514800 Israel.

Figure 7A:
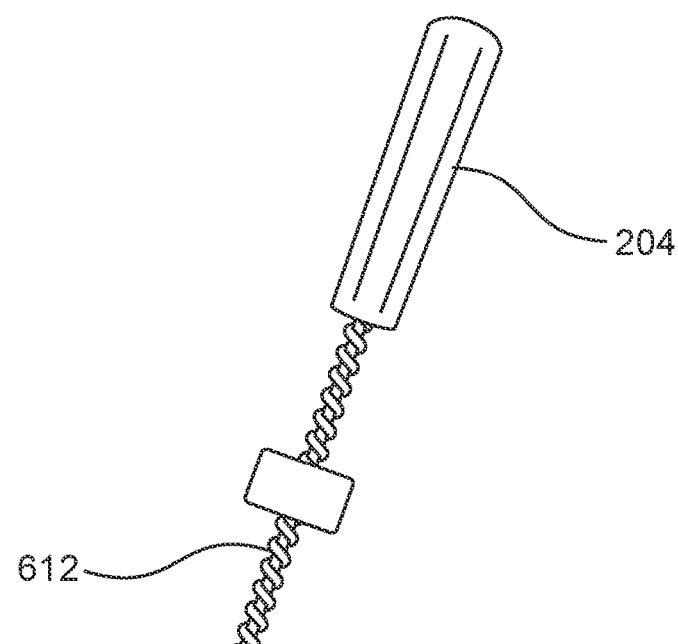
FIG. 7A is a perspective view of endodontic file in accordance with an embodiment of the current invention.
Figure 7B:
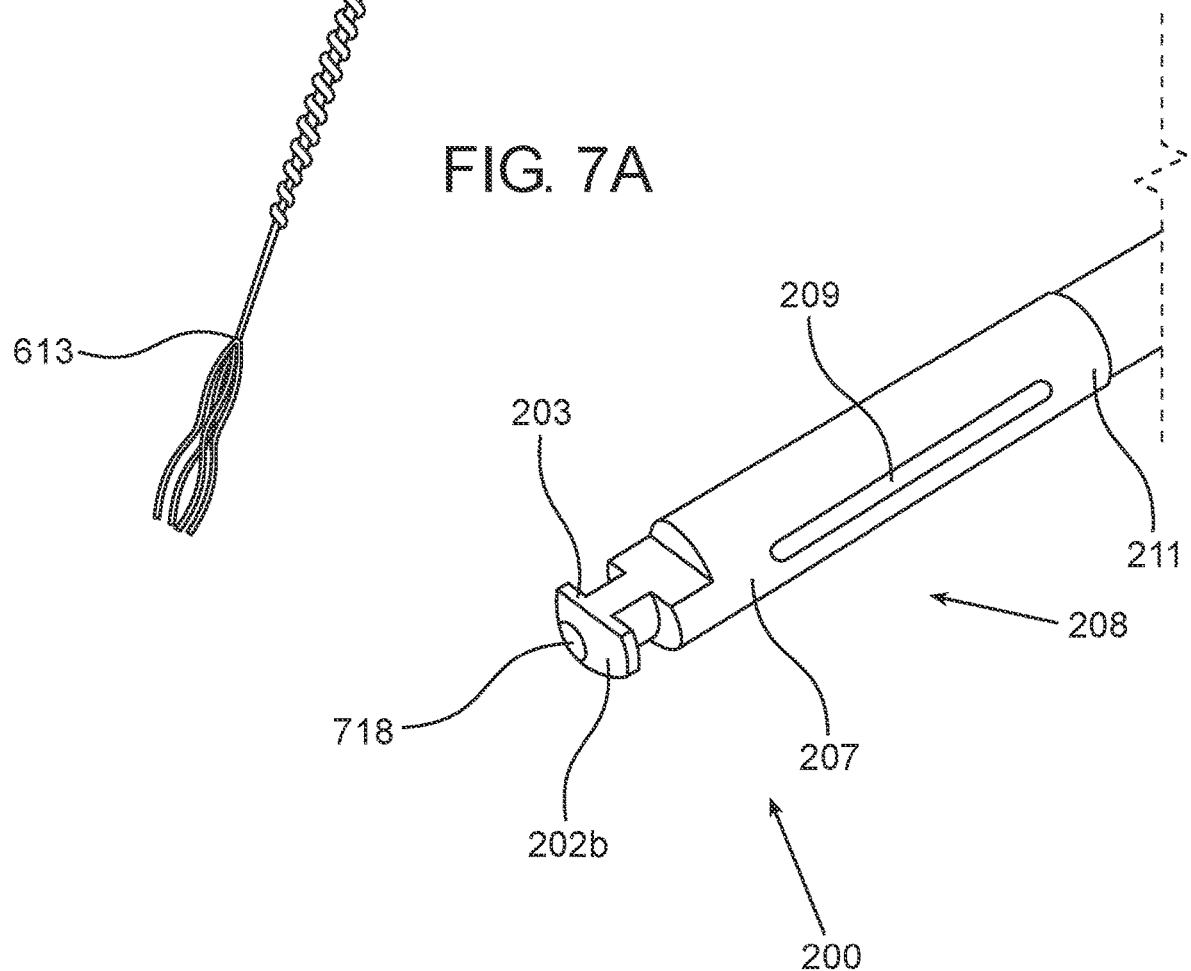
FIG. 7B is a proximal view of an adapter in accordance with an embodiment of the current invention.

FIGS. 7A, 7B are a perspective view of endodontic file and a proximal view of an adapter respectively in accordance with an embodiment of the current invention. Optionally there is a proximal opening 718 in the adapter. The proximal opening 718, optionally makes it easier to insert a fitting 204 into sleeve 207 by proving an outlet from trapped air.

Figure 8:
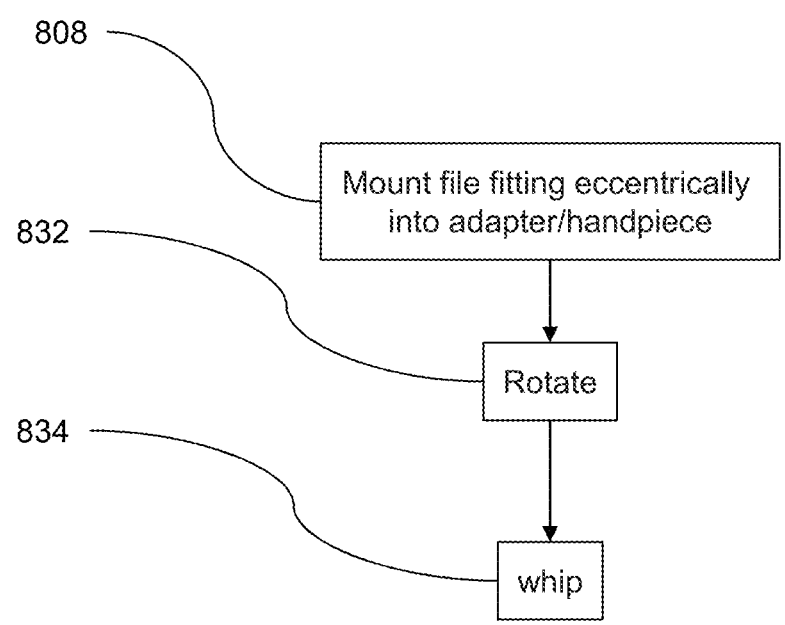
FIG. 8 is a flow chart illustration of a method of whipping and endodontic file in accordance with an embodiment of the current invention.

FIG. 8 is a flow chart illustration of a method of whipping and endodontic file in accordance with an embodiment of the current invention. In some embodiments, an endodontic file is mounted 808 onto a handpiece eccentrically. Optionally, the file may be mounted to an adapter non-centrically. For example, the center of the mount may be translated away from the axis of rotation of the adapter. Alternatively or additionally, the longitudinal axis of the file may not be parallel to the axis of rotation of the adapter. Alternatively or additionally, the file may be mounted eccentrically to the handpiece. Optionally, when the handpiece rotates 832 the adapter and/or the file, a distal portion of the file may whip 834 around. For example, in some cases when the file is inside a root canal the whipping 834 effect may cause the device to clean and/or more evenly clean the walls of the canal. For example, in some cases whipping 834 effect may improve the mixing and activation of chemicals in the canal. Optionally torque on the file is limited.

Figure 9:
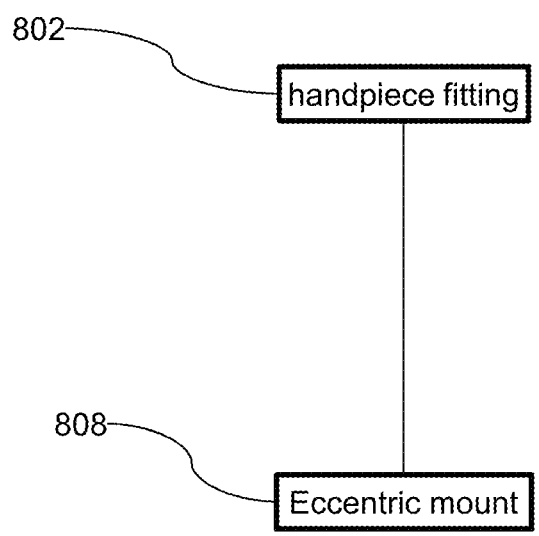
FIG. 9 is a block diagram illustration of non-concentric endodontic file adapter and file fitting in accordance with an embodiment of the current invention.

FIG. 9 is a block diagram illustration of an eccentric endodontic file adapter in accordance with an embodiment of the current invention. In some embodiments, the adapter is configured to cause the file to rotate and/or whip. Optionally, an adapter may include a fitting 802 for a dental handpiece (e.g. fitting 202b of FIG. 2B) and/or a mount 808 for an endodontic file. Optionally the fitting 802 and/or mount 808 are positioned eccentrically. For example, when a file is connected the mount 808 it may be retained with its longitudinal axis (e.g. a longitudinal axis of a connection fitting (e.g. fitting 204 as illustrated in FIGS. 2B and 2C) offset from an axis rotation of the fitting 802. Alternatively or additionally, the longitudinal axis of the file may be oriented non-parallel to the axis of rotation of the handpiece fitting 802. An adapter is optionally configured for multi-use (for example it may be made of sterilizable material such as metal). Alternatively or additionally, the adapter may be single use (for example, it may be made of cheap molded plastic). Optionally the adapter includes a torque limiter.

Figure 10:
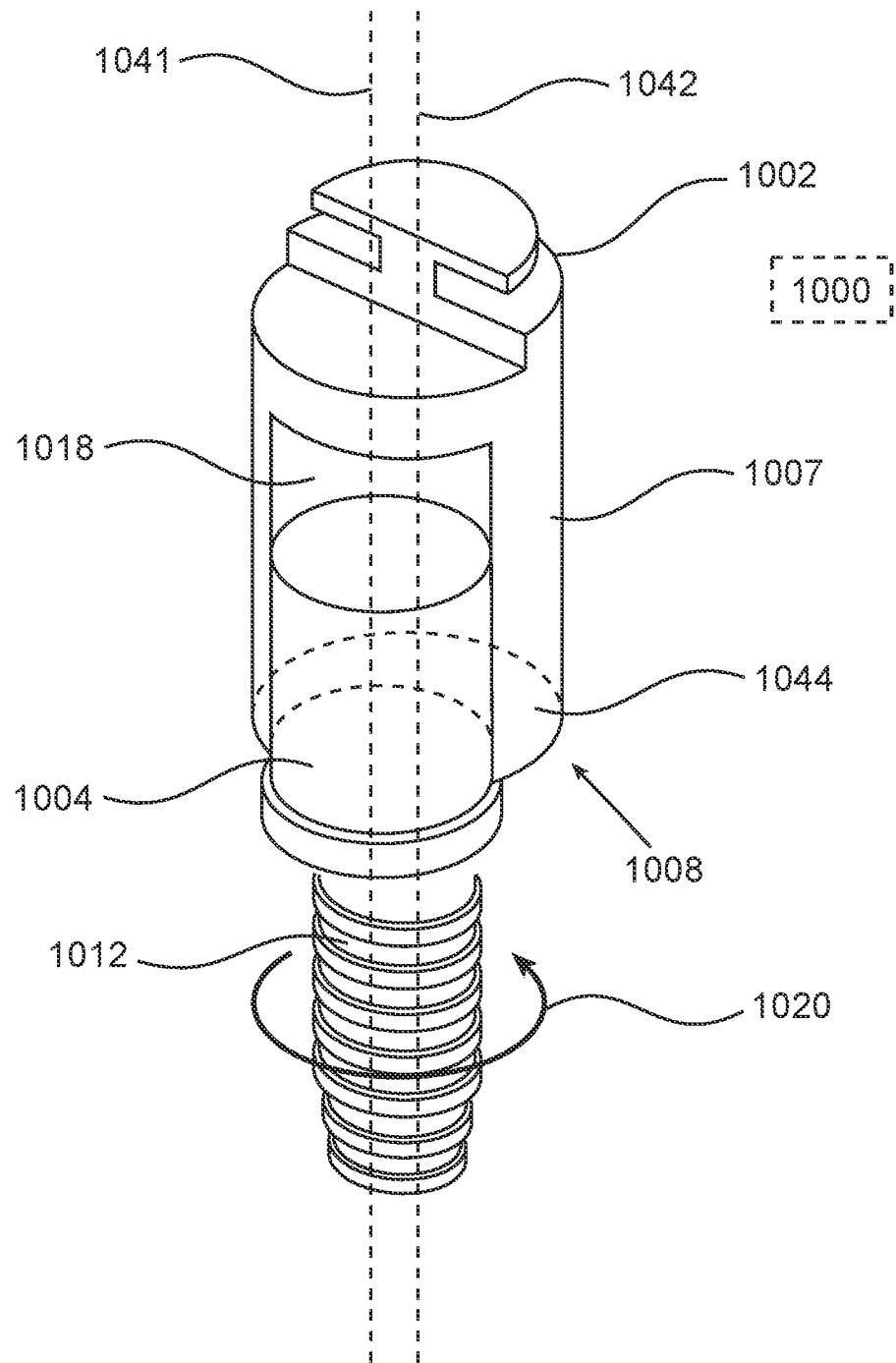
FIG. 10 is a perspective view of non-concentric endodontic file adapter and file fitting in accordance with an embodiment of the current invention.

FIG. 10 is a perspective view of endodontic file adapter 1000 and file fitting in accordance with an embodiment of the current invention. In some embodiments, adapter 1000 includes a fitting 1002 for a dental handpiece. For example, the fitting 1002 may include a standard fitting 1002, for example for a fast chucking self centering collet. Optionally, fitting 1002 includes a D-shaped cross section and/or a flange for a quick and/or reliable connection. For example, the fitting 1002 may fit a 2.35 mm collet. For example, the fitting 1002 may be configured for rotation around an axis 1042. Optionally, the adapter includes an eccentric mount 1008 for an endodontic file 1012. For example, the mount 1008 may include a sleeve 1007. For example, the outer size and/or shape of the sleeve 1007 may be appropriate to the handpiece fitting 1002. For example, the outer surface of sleeve 1007 may be a circular cylinder that is concentric and/or parallel to the axis 1042 of fitting 1002 (e.g. fitting 1002 and an outer surface of mount 1008 may be concentric). For example, the outer diameter sleeve 1007 may be appropriate to fitting 1002 (e.g. 2.35 mm for a 2.35 mm collect fitting). Optionally the mount 1008 is configured to hold file 1012 eccentrically with respect to fitting 1002. For example, mount 1008 may have a cavity 1018 that is configured to hold a fitting 1004 of file 1012. Optionally cavity 1018 is offset with respect to axis 1042 of rotation of fitting 1002. For example, a longitudinal axis 1041 of the cavity 1018 may be offset between 0.001 to 0.01 mm and/or between 0.01 to 0.1 mm and/or between 0.1 to 0.5 mm and/or between 0.5 to 1 mm and/or between 1 to 2 mm with respect to axis 1042. Alternatively or additionally, cavity 1018 may be oriented at a non-parallel angle with respect to axis 1042. For example, the longitudinal axis 0141 of the cavity 1018 may be angled at between 0.1 to 2.0 degrees and/or between 2 to 5 degrees and/or between 5 to 10 degrees and/or between 10 to 20 degrees of axis 1042. In some embodiments, cavity 1018 may be so far offset from the center of sleeve 1007 that it may intersect the outer edge of sleeve 1007 (for example sleeve 1007 may have an open profile and/or a crescent shaped profile 1044). Optionally, when adapter is rotated (for example using a dental handpiece connected to fitting 1002) it rotates a dental file on a path that is eccentric to the axis 1041 of the file 1012. For example, the file 1012 is rotated around axis 1042.

In some embodiments, adapter 1000 is single use and/or disposable. For example, adapter 1000 may be made of plastic. Alternatively or additionally, adapter 1000 may be configured for multiple use. For example, adapter may be made of sterilizable material (e.g. metal).

In some embodiments, adapter 1000 has an opening in the outer edge. For example, the eccentric position of cavity 1018 and the elasticity of file 1012 may produce whipping behavior when file 1012 is rotated eccentrically. Optionally, fitting 1004 is made of rubber. In some embodiments, the eccentric mount 1008 will cause additional circular motion 1020 in space in addition to the eccentric movement created in the high RPM as a function elasticity of the file 1012 or the brush.

The fitting 1002 of the adapter 1000 is optionally built to the standard size of the files and allows locking in any existing handpiece mechanism. Optionally the adapter 1000 includes a torque limiter. For example, the connection between fitting 1004 if file 1012 and cavity 1018 of mount 1008 may be a friction fitting that allows slippage at high torque, thereby limiting the torque on the file 1012.

Figure 11:
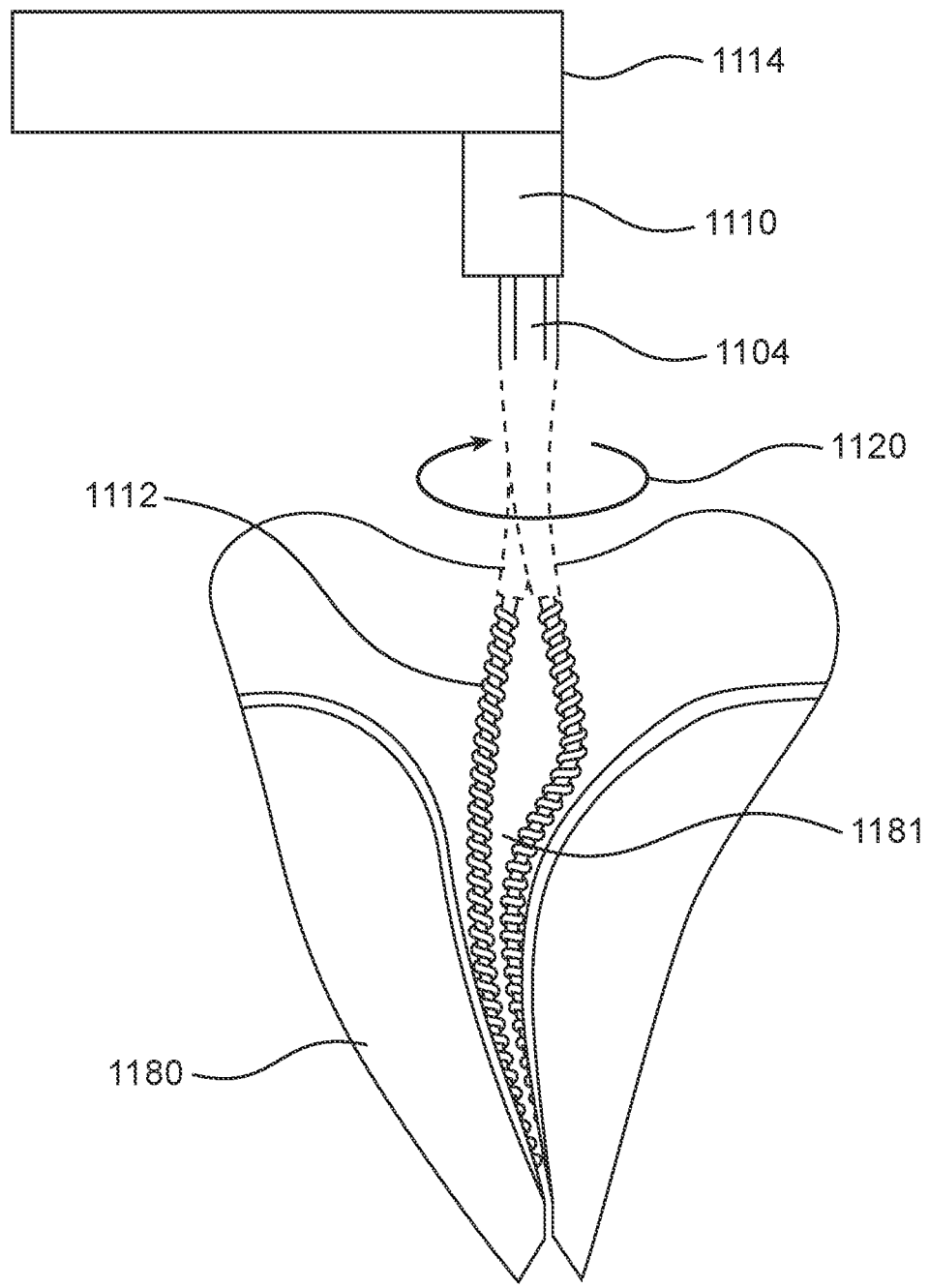
FIG. 11 is a perspective view of whipping endodontic file adapter and file fitting in accordance with an embodiment of the current invention.

FIG. 11 is a perspective view of whipping endodontic file adapter and file fitting in accordance with an embodiment of the current invention. In some embodiments a fitting 1104 of an endodontic file 1112 is attached by an eccentric adapter 1100 to a dental handpiece 1114. Optionally the eccentricity of the adapter 1100 and/or the flexibility of file 1112 causing a whipping motion 1120 of the distal end of the file 1112. In some embodiments, the whipping motion 1120 brings file 1112 into better contact with the size walls of a channel 1181 in a tooth 1180.

Figure 12A:
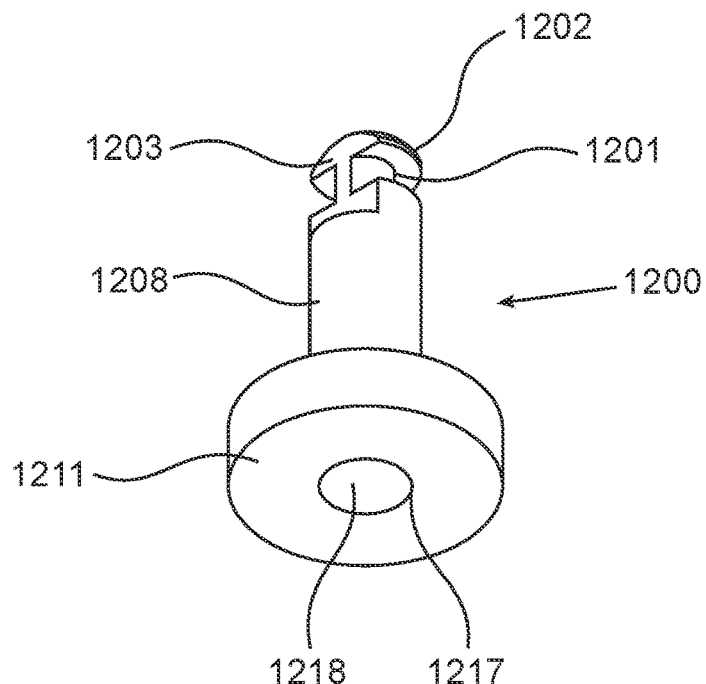
FIG. 12A illustrates an adapter in accordance with an alternative embodiment of the current invention.
Figure 12B:
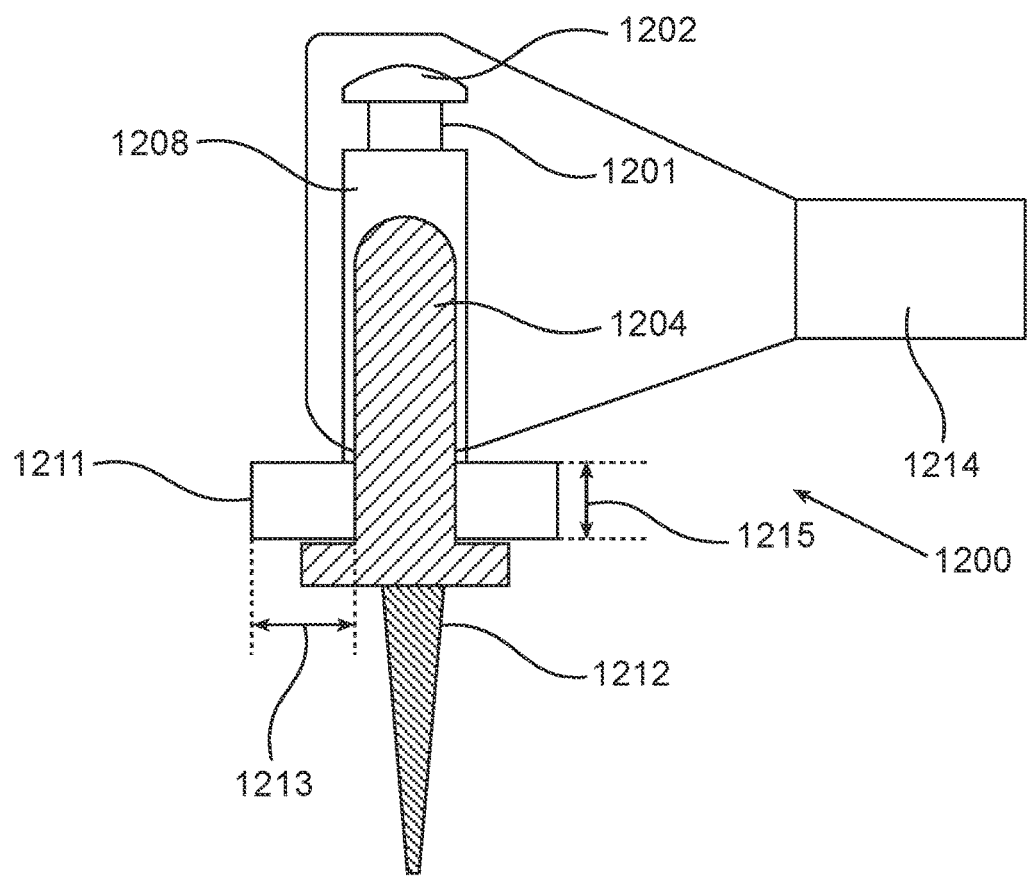
FIG. 12B illustrates an adapter in a handpiece in accordance with an alternative embodiment of the current invention.

FIGS. 12A and 12B illustrate an adapter in accordance with an alternative embodiment of the current invention. In some embodiments, an adapter includes a mount 1208 for an endodontic file 1212. Optionally the mount 1208 limits torque on the file 1212. For example, the mount 1208 may hold a fitting 1204 of the file 1212 by a friction connection (e.g. inside a cavity 1218 for example as illustrated in FIG. 12B) that allows slipping if the torque between the mount 1208 and the file rise above a critical value (for example as described in various embodiments herein above).

In some embodiments, a proximal portion of the adapter 1200 (e.g. fitting 1202, groove 1201, and/or mount 1208 fits into and/or attaches to a standard chuck of a dental handpiece 1214 (for example as illustrated in FIG. 12B). For example, the adapter 1200 may include a fitting 1202 that attaches to a collet. For example, fitting 1202 may include a flat surface 1203 that facilitates transfer of high torque from the handpiece 1214 to the adapter 1200. For example, fitting 1202 may include a groove 1201 for quick connect (for example by an interference connector) and/or to lock the adapter to the collet.

In some embodiments, an adapter 1200 will include a flange 1211. Optionally, flange 1211 is positioned distal to the fitting 1202 for the handpiece 1214. Optionally, adapter 1200 is shaped and size such that when fitting 1202 is inserted into handpiece 1214, flange 1211 remains outside of the handpiece 1214 (e.g. as illustrated in FIG. 12B). For example, flange 1211 may shield the handpiece 1214 (e.g. the chuck thereof) from spraying fluids. Alternatively or additionally, flange 1211 may make it easier to handle adapter 1200 and/or make it easier to attach endodontic file 1212 thereto. For example, the opening to cavity 1218 in flange 1211 is beveled inward, for example making it easier to slide fitting 1204 of file 1212 into cavity 1218. In some embodiments, flange 1211 remains outside of the bit mount (e.g. the chuck and collet thereof) of the handpiece 1214 and/or projects laterally beyond the portion of fitting 1204 that fits into the bit mount of the handpiece 1214. The extra material of the flange facilitates cutting out the bevel 1217. For example, it may be very difficult to cut a bevel into the thin walls of the fitting 1204 proximal to the flange 1211 (which may be thin to fit into the bit mount of the handpiece 1214). For example, flange 1211 may be project 1213 laterally from to outer lateral edge of mount 1208 between 1 to 3 mm and/or between 0.2 to 1 mm and/or between 3 to 6 mm. In some embodiments, flange 1211 may have a thickness 1215 ranging (in the proximal-distal direction) between 1 to 2 mm and/or between 0.1 to 1 mm and/or between 2 to 5 mm.

Figure 13A:
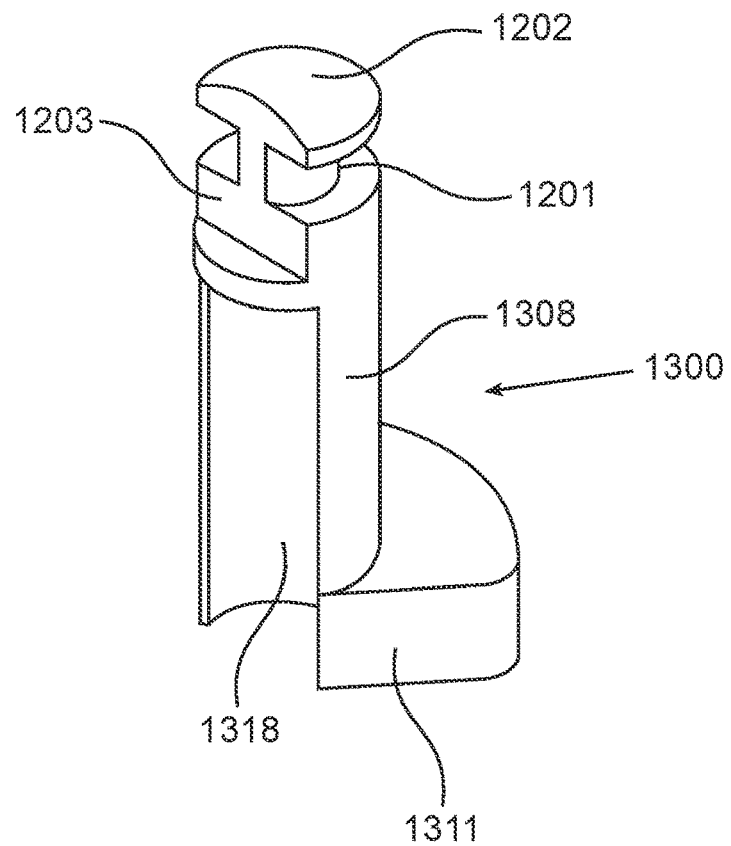
FIG. 13A illustrates an eccentric adapter in accordance with an alternative embodiment of the current invention.
Figure 13B:
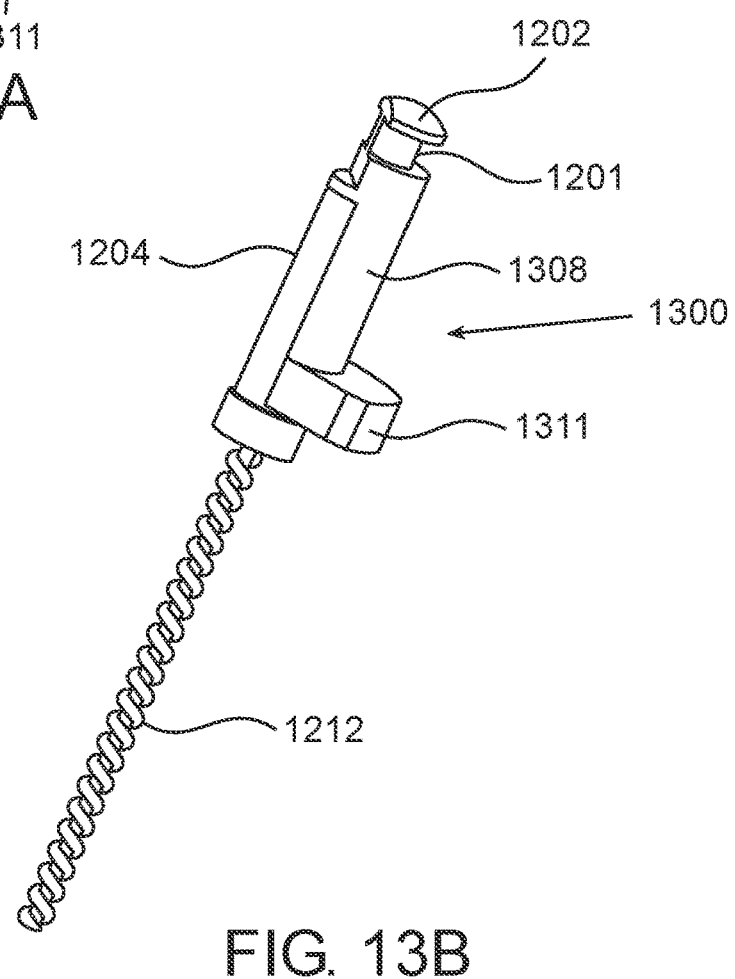
FIG. 13B illustrates an eccentric adapter and endodontic file in accordance with an alternative embodiment of the current invention.

FIGS. 13A and 13B illustrate an eccentric adapter in accordance with an alternative embodiment of the current invention. In some embodiments, a fitting 1204 of an endodontic file 1212 may be attached eccentrically to a mount 1308 of an adapter 1300. For example, the wall on one side of a cavity 1318 of mount 1308, into which the adapter 1204 is inserted, may be thinner than the wall on the other side of the cavity 1318 and/or at some point the wall cavity 1318 may be completely missing (the edge of cavity 1318 may reach the outer edge of mount 1308). For example, the cavity 1318 may be an open channel. Optionally a flange 1311 may partially surround the distal opening of cavity 1318. Alternatively or additionally, flange 1311 may completely surround the distal opening of cavity 1318 (e.g. the flange 1311 may have an annular form like flange 1211) even when cavity 1318 is eccentric and/or even when cavity 1318 is an open channel. Optionally, the distal side of flange 1311 (e.g. which leads to cavity 1318) may be beveled.

Figure 14A:
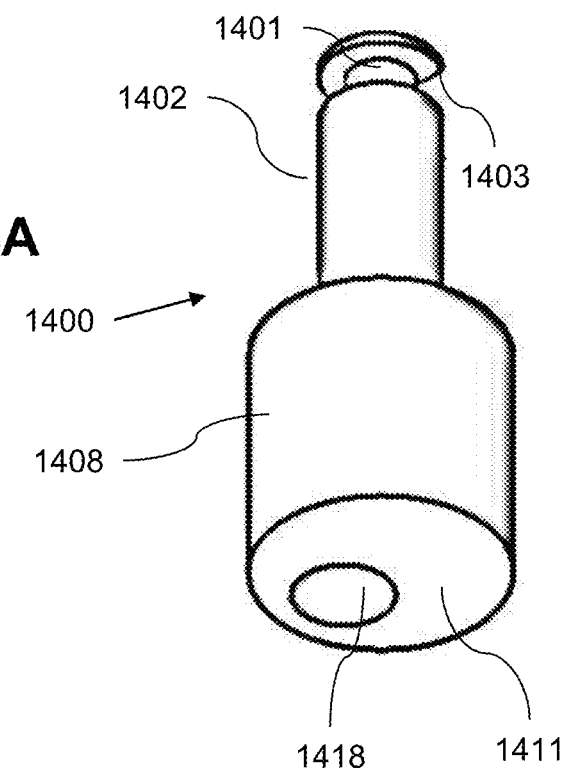
FIG. 14A illustrates a perspective view of an adapter in accordance with an alternative embodiment of the current invention.
Figure 14B:
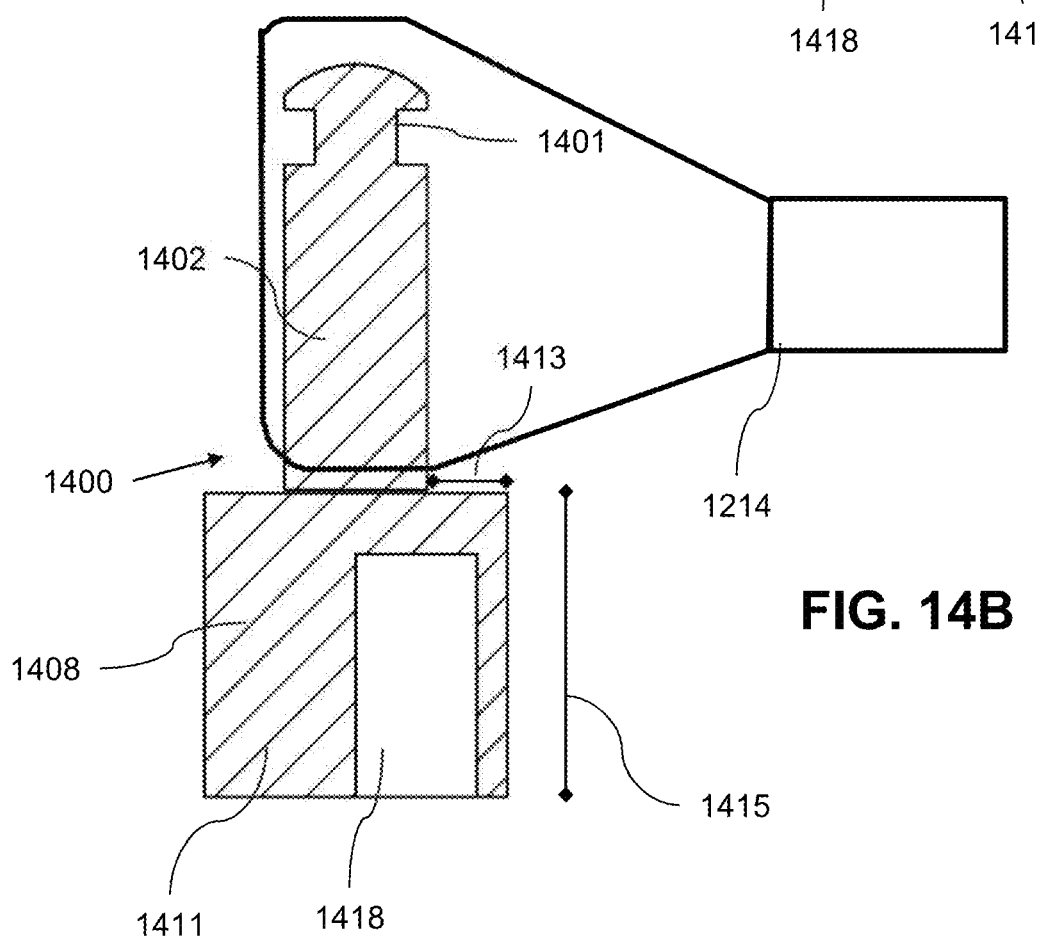
FIG. 14B illustrate a cross-sectional view of an adapter in accordance with an alternative embodiment of the current invention.

FIG. 14A illustrates a perspective view of an adapter in accordance with an alternative embodiment of the current invention. FIG. 14B illustrate a cross-sectional view of an adapter in accordance with an alternative embodiment of the current invention. In some embodiments, an adapter 1400 will include a flange 1411. Optionally, flange 1411 is positioned distal to a fitting 1402 for a handpiece (e.g. handpiece 1214). In some embodiments, a mount 1408 for an endodontic file 1212 is positioned entirely and/or mostly in the flange 1411. Optionally fitting 1402 may be solid and/or have a hollow that is smaller than a cavity 1418 of the mount 1408 (for example, the width of a hollow in mount 1408 may be less than 90% and/or less than 50% and/or less than 20% the diameter of cavity 1418) and/or the length of a hollow in mount 1408 may be less than 90% and/or less than 50% and/or less than 20% the length of cavity 1418). Optionally, adapter 1400 is shaped and size such that when fitting 1402 is inserted into handpiece 1214, flange 1411 remains outside of the handpiece 1214 (e.g. as illustrated in FIG. 14B) and/or mostly outside of the handpiece (e.g. at least 90% and/or at least 50% of cavity 1418 is outside of fitting 1402). In some embodiment, positioning mount 1408 outside of fitting 1402 makes it easier to fashion the adapter 1400 (e.g. because it is not necessary to have such thin walls in the mount 1408). In some embodiments, placing mount 1408 in flange 1411 allows a higher level of eccentricity than when the mount (e.g. mount 1308) must fit into the bit mount of the handpiece. For example, part of the cavity 1418 may be positioned laterally outwards with respect to the outer edge of handpiece fitting 1402.

In some embodiments, flange 1411 may shield the handpiece 1214 (e.g. the chuck thereof) from spraying fluids. Alternatively or additionally, flange 1411 may make it easier to handle adapter 1400 and/or make it easier to attach endodontic file 1212 thereto. For example, the opening to cavity 1418 in flange 1411 may be beveled inward, for example making it easier to slide fitting 1204 of file 1212 into cavity 1418. In some embodiments, flange 1411 remains outside of the bit mount (e.g. the chuck and collet thereof) of the handpiece 1214 and/or projects laterally beyond the portion of fitting 1204 that fits into the bit mount of the handpiece 1214. For example, flange 1411 may project 1413 laterally from to outer lateral edge of fitting 1402 between 1 to 3 mm and/or between 0.2 to 1 mm and/or between 3 to 6 mm. In some embodiments, flange 1411 may have a thickness 1415 ranging (in the proximal-distal direction) between 10 to 15 mm and/or between 15 to 20 mm and/or between 20 to 50 mm and/or between 5 to 10 mm.

In some embodiments, the mount 1408 limits torque on the file 1212. For example, the mount 1408 may hold a fitting 1204 of the file 1212 by a friction connection (e.g. inside a cavity 1418) that allows slipping if the torque between the mount 1408 and the file rise above a critical value (for example as described in various embodiments herein above).

In some embodiments, a proximal portion of the adapter 1400 (e.g. fitting 1402, groove 1401, fits into and/or attaches to a standard chuck of a dental handpiece 1214. For example, the adapter 1400 may include a fitting 1402 that attaches to a collet. For example, fitting 1402 may include a flat surface 1403 that facilitates transfer of high torque from the handpiece 1214 to the adapter 1400. For example, fitting 1402 may include a groove 1401 for quick connect (for example by an interference connector) and/or to lock the adapter to the collet.

Figure 15A:
FIG. 15A illustrates a perspective view of an adapter in accordance with an alternative embodiment of the current invention.
Figure 15B:
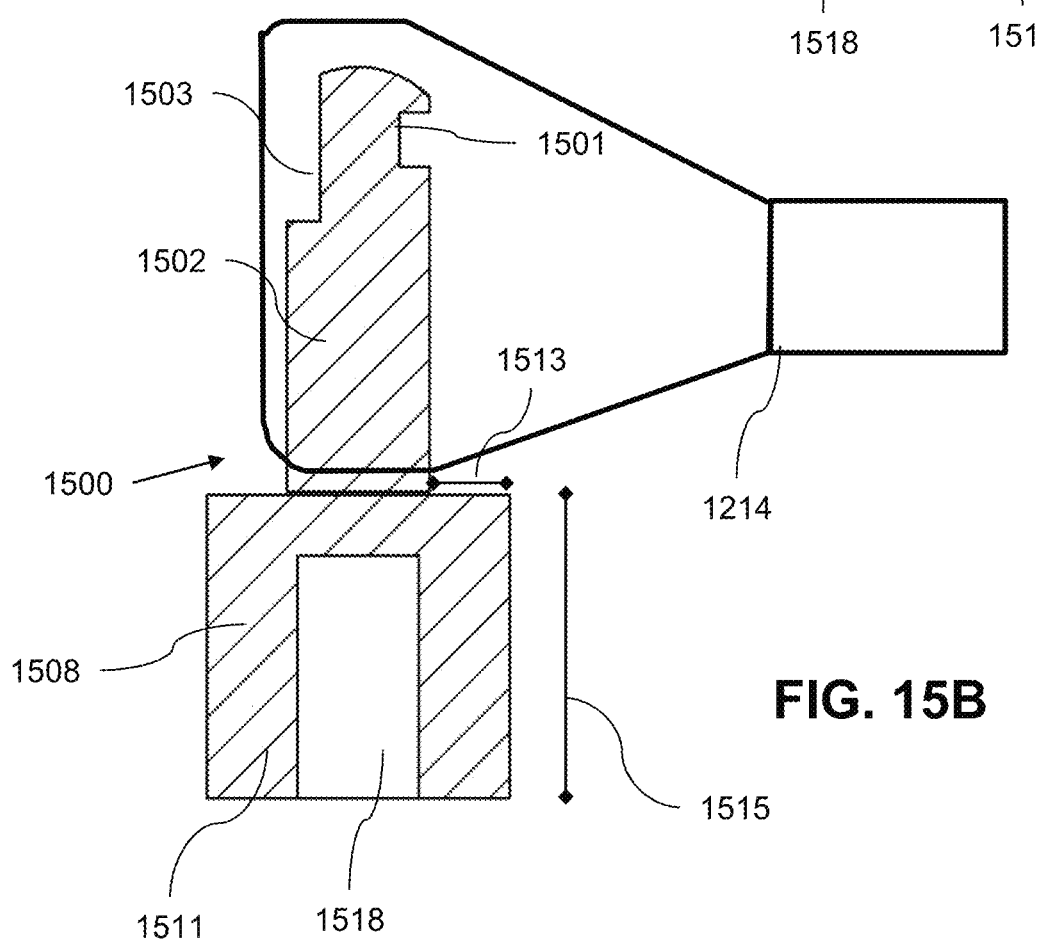
FIG. 15B illustrate a cross-sectional view of an adapter in accordance with an alternative embodiment of the current invention.

FIG. 15A illustrates a perspective view of an adapter in accordance with an alternative embodiment of the current invention. FIG. 15B illustrate a cross-sectional view of an adapter in accordance with an alternative embodiment of the current invention. In some embodiments, an adapter 1500 will include a flange 1511. Optionally, flange 1511 is positioned distal to a fitting 1502 for a handpiece (e.g. handpiece 1214). Alternatively or additionally, fitting 1502 may include a simple friction fitting that fits handpiece 1214 well enough to work (for example as described below with respect to FIG. 16). In some embodiments, a mount 1508 for an endodontic file 1212 is positioned entirely and/or mostly in the flange 1511. Optionally fitting 1502 may be solid and/or have a hollow that is smaller than a cavity 1518 of the mount 1508 (for example, the width of a hollow in mount 1508 may be less than 90% and/or less than 50% and/or less than 20% the diameter of cavity 1518) and/or the length of a hollow in mount 1508 may be less than 90% and/or less than 50% and/or less than 20% the length of cavity 1518). Optionally, adapter 1500 is shaped and size such that when fitting 1502 is inserted into handpiece 1214, flange 1511 remains outside of the handpiece 1214 (e.g. as illustrated in FIG. 15B) and/or mostly outside of the handpiece (e.g. at least 90% and/or at least 50% of cavity 1518 is outside of mount 1502). In some embodiment, positioning mount 1508 outside of fitting 1502 makes it easier to fashion the adaptor 1500 (e.g. because it is not necessary to have such thin walls in the mount 1508). In some embodiments, mount 1508 and/or cavity 1518 may be positioned concentric to fitting 1502.

In some embodiments, flange 1511 may shield the handpiece 1214 (e.g. the chuck thereof) from spraying fluids. Alternatively or additionally, flange 1511 may make it easier to handle adapter 1500 and/or make it easier to attach endodontic file 1212 thereto. For example, the opening to cavity 1518 in flange 1511 may be beveled inward, for example making it easier to slide fitting 1204 of file 1212 into cavity 1518. In some embodiments, flange 1511 remains outside of the bit mount (e.g. the chuck and collet thereof) of the handpiece 1214 and/or projects laterally beyond the portion of fitting 1502 that fits into the bit mount of the handpiece 1214. For example, flange 1511 may project 1513 laterally from to outer lateral edge of fitting 1502 between 1 to 3 mm and/or between 0.2 to 1 mm and/or between 3 to 6 mm. In some embodiments, flange 1511 may have a thickness 1515 ranging (in the proximal-distal direction) between 10 to 15 mm and/or between 15 to 20 mm and/or between 20 to 50 mm and/or between 5 to 10 mm.

In some embodiments, the mount 1508 limits torque on the file 1212. For example, the mount 1508 may hold a fitting 1204 of the file 1212 by a friction connection (e.g. inside a cavity 1518) that allows slipping if the torque between the mount 1508 and the file rise above a critical value (for example as described in various embodiments herein above).

In some embodiments, a proximal portion of the adapter 1500 (e.g. fitting 1502, groove 1501, fits into and/or attaches to a standard chuck of a dental handpiece 1214. For example, the adapter 1500 may include a fitting 1502 that attaches to a collet. For example, fitting 1502 may include a flat surface 1503 that facilitates transfer of high torque from the handpiece 1214 to the adapter 1500. For example, fitting 1502 may include a groove 1501 for quick connect (for example by an interference connector) and/or to lock the adapter to the collet.

Figure 16:
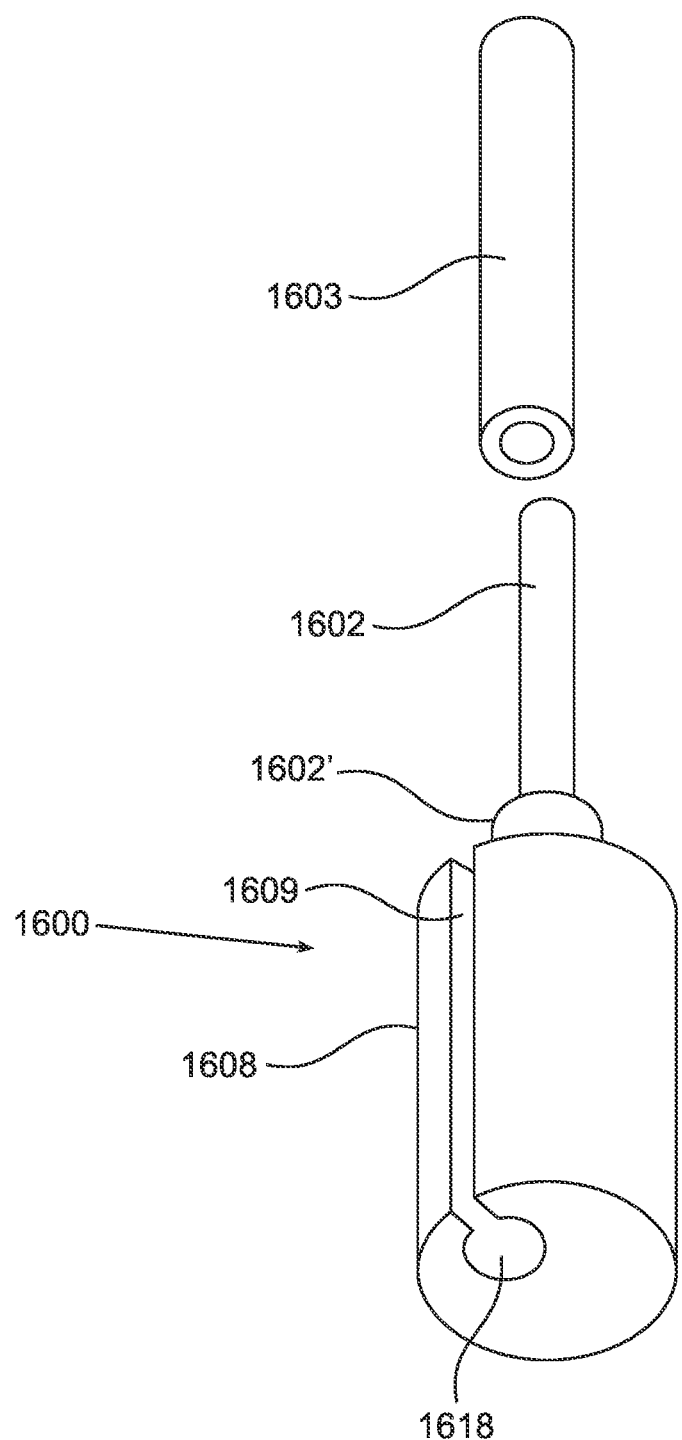
FIG. 16 illustrates a perspective view of an adapter in accordance with an embodiment of the current invention.

FIG. 16 illustrates a perspective view of an adapter in accordance with an embodiment of the current invention. in some embodiments, an adaptor may include a simple friction fitting 1602. The friction fitting 1602 is optionally configured to fit a standard endodontic file mount. For example, a portion 1602' of the fitting 1602 may be the same as a fitting 204 of an endodontic file. For example, adaptor 1600 may be used to attach an endodontic file to eccentrically to a concentric rotating handpiece of the endodontic file. For example, portion 1602' may have an outer diameter of approximately 2.0 mm and/or between 1.9 to 2.1 mm. For example, the thin section of fitting 1602 may have an outer diameter of approximately 1.5 mm and/or between 1 to 2 mm and/or between 0.5 to 1 mm.

In some embodiments, the adapter 1600 will include a mount 1608 for an endodontic file. Optionally, the mount may include an elasticity enhancement for example a slit 1609. In some embodiments, a cavity 1618 may hold a fitting 204 of an endodontic file tightly enough to prevent release of the file even if a user rotates the system at a speed above the recommended limit. Optionally the mount 1608 will be elastic enough to allow slippage of the file when a torque passes a threshold (for example as described herein above for other embodiments). For example, cavity 1618 may be tight (e.g. slightly smaller in diameter than a fitting of the file). For example, the diameter of the cavity may be between 5 to 10% smaller than the fitting of the file and/or between 1 to 5% smaller and/or between 10 to 30% smaller. For example, if the fitting of the file is 2 mm diameter, the diameter of the cavity 1618 may range between 1.8 to 1.9 mm and/or between 1.9 to 1.99 mm and/or between 1.5 to 1.8 mm. In some embodiments a fitting adapter 1603 is supplied. For example, adapter 1603 includes an elastic sleeve (e.g. made of Silicone, rubber, and/or plastic elastomer). The sleeve optionally fits around a small fitting 1602 and/or increase its diameter to fit a larger chuck. For example, adapter may fit over fitting 1602 and increase its diameter to fit tightly into a 2.35 (d type standard) mm chuck (e.g. the outer diameter of fitting 1602 with adapter 1603 may be between 1.9 to 2.1 mm) of a endodontic file chuck and/or increase its diameter to fit into standard chuck of a burr handpiece (e.g. the 2.35 mm chuck of handpiece 1214)

(e.g. the outer diameter of fitting 1602 with adapter 1603 may be between 2.3 to 2.5 mm). For example, the Optionally, sleeve fits tightly and/or holds to the chuck of the handpiece 1214 by friction. Alternatively or additionally, fitting 1602 of an adapter 1600 may be large enough to fit by friction to a standard chuck of a burr handpiece (e.g. the outer diameter of fitting 1602 may range between 2.3 to 2.5). For example, a friction fitting may sufficient to connect to the handpiece 1214 and/or cheaper than a specialized fitting such fitting 1502 as illustrated in FIG. 15A.

It is expected that during the life of a patent maturing from this application many relevant technologies, for example dental handpieces, fittings and endodontic tools will be developed and the scope of the terms of the specification e.g. handpiece, mount, fitting and file are intended to include all such new technologies a priori.

As used herein the term "about" refers to ±10% The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for endodontic procedure comprising:
    an endodontic file including a friction fitting adapted for holding and spinning the file;
    a high torque dental handpiece having a chuck;
    an adapter including:
        a chuck fitting having a proximal portion inside said chuck and held reversibly by said chuck and
        a mount including a cavity having a distal opening with said friction fitting reversibly inserted into said cavity;
    said cavity reversibly holding said friction fitting stationary with respect to the cavity transmitting a transmitted torque to said endodontic file up to a predetermined threshold torque and allowing slippage of said friction fitting in said cavity when said transmitted torque is greater than said threshold torque thereby limiting said transmitted torque between said high torque dental handpiece and said endodontic file to said threshold torque, and
    wherein said chuck fitting of said adapter includes a friction fitting configured to limit said transmitted torque transferred between said handpiece and said adapter.

2. The system of claim 1, wherein said handpiece is configured for rotating said adapter at a rate of between 1,000 and 5,000 RPM.

3. The system of claim 1, wherein said chuck fitting includes a sleeve having an outer diameter configured to fit into said chuck and wherein at least a portion of said cavity in within said sleeve.

4. The system of claim 1, wherein said cavity is cylindrical.

5. The system of claim 1, wherein said cavity fixed in position with respect to said chuck fitting.

6. A system for endodontic procedure comprising:
an endodontic file including a friction adapted for holding and spinning the file;
a high torque dental handpiece having a chuck;
an adapter including:
a chuck fitting having a proximal portion inside said chuck and held reversibly by said chuck and
a mount including a cavity having a distal opening with said friction fitting reversibly inserted into said cavity,
said cavity reversibly holding said friction fitting stationary with respect to the cavity transmitting a transmitted torque to said endodontic file up to a predetermined threshold torque and allowing slippage of said friction fitting in said cavity when said transmitted torque is greater than said threshold torque thereby limiting said transmitted torque between said high torque dental handpiece and said endodontic file to said threshold torque, wherein said friction fitting of said adapter is configured to limit said transmitted torque transferred between said handpiece and said adapter, and
wherein said cavity is fixed in position with regard with said chuck fitting and an axis of said cavity is eccentric in relation to an axis of said chuck fitting.

7. The system of claim 6, further comprising a flange on the friction fitting.

8. The system of claim 6, wherein said threshold is 0.1 N.cm.

9. The system of claim 6, wherein said cavity is fixed in position with regard with said chuck fitting and the axis of said cavity is not parallel to the axis of said chuck fitting.

10. The system of claim 6, wherein said mount is positioned at least partially inside said chuck fitting and said mount is fixedly positioned with respect to said chuck fitting such that rotation of the chuck fitting around the chuck fitting axis rotates the mount around said chuck fitting axis.

11. The system of claim 10, wherein said mount is positioned eccentrically with respect to said chuck fitting such that rotating of said chuck fitting around said chuck fitting axis by said handpiece rotates said endodontic file around said chuck fitting axis on a path that is eccentric to an axis of the endodontic file.

12. The system of claim 10, wherein said cavity extends to a distal end of said mount and wherein a flange extends radially outward from a distal portion of said mount encircling said distal portion of said mount.

13. The system of claim 6, wherein an axis of said mount is offset in relation to the axis of said chuck fitting.

14. The system of claim 6, wherein an axis of said mount is not parallel to the axis of said chuck fitting.

* * * * *